United States Patent
Smith et al.

(10) Patent No.: US 7,710,273 B2
(45) Date of Patent: May 4, 2010

(54) REMOTE COMMUNICATION DEVICES, RADIO FREQUENCY IDENTIFICATION DEVICES, WIRELESS COMMUNICATION SYSTEMS, WIRELESS COMMUNICATION METHODS, RADIO FREQUENCY IDENTIFICATION DEVICE COMMUNICATION METHODS, AND METHODS OF FORMING A REMOTE COMMUNICATION DEVICE

(75) Inventors: Freddie W. Smith, Boise, ID (US); Dirgha Khatri, Boise, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 423 days.

(21) Appl. No.: 10/791,187

(22) Filed: Mar. 1, 2004

(65) Prior Publication Data

US 2004/0178912 A1 Sep. 16, 2004

Related U.S. Application Data

(63) Continuation of application No. 09/389,534, filed on Sep. 2, 1999, now abandoned.

(51) Int. Cl.
*G08B 13/14* (2006.01)
(52) U.S. Cl. ............... 340/572.7; 340/10.1; 343/700 R
(58) Field of Classification Search ................... None
See application file for complete search history.

(56) References Cited

U.S. PATENT DOCUMENTS

| | | | |
|---|---|---|---|
| 3,569,976 A | 3/1971 | Korvin et al. | |
| 3,733,608 A * | 5/1973 | McGhay et al. | ............. 370/339 |
| 3,745,568 A | 7/1973 | Works et al. | |
| 3,745,569 A | 7/1973 | Works et al. | |
| 4,050,063 A | 9/1977 | Schull | |
| 4,075,632 A | 2/1978 | Baldwin et al. | |
| 4,173,019 A | 10/1979 | Williams | |
| 4,401,971 A | 8/1983 | Saito et al. | |

(Continued)

FOREIGN PATENT DOCUMENTS

EP 451482 10/1991

OTHER PUBLICATIONS

Chartered Semiconductor Manufacturing, "Toppan Announces Volume Production of Next Generation RFID Chip," press release, Jul. 8, 2003.

(Continued)

*Primary Examiner*—George A Bugg
(74) *Attorney, Agent, or Firm*—Greenberg Traurig, LLP

(57) ABSTRACT

Remote communication devices, radio frequency identification devices, wireless communication systems, wireless communication methods, radio frequency identification device communication methods, and methods of forming a remote intelligent communication device are provided. According to one aspect, a remote intelligent communication device includes communication circuitry configured to at least one of receive communication signals and generate communication signals; and an antenna coupled with the communication circuitry and substantially tuned to a plurality of frequencies, the antenna being configured to communicate wireless signals corresponding to the communication signals including at least one of receiving wireless signals and outputting wireless signals. Another aspect includes a wireless communication method including providing a remote intelligent communication device having an antenna substantially tuned to a plurality of frequencies; and communicating wireless signals using the antenna including at least one of receiving wireless signals at one of the frequencies and outputting wireless signals at one of the frequencies.

87 Claims, 4 Drawing Sheets

U.S. PATENT DOCUMENTS

| | | | |
|---|---|---|---|
| 4,623,874 A * | 11/1986 | Thoma | 341/89 |
| 4,630,044 A | 12/1986 | Polzer | |
| 4,691,202 A | 9/1987 | Denne et al. | |
| 4,692,769 A * | 9/1987 | Gegan | 343/700 MS |
| 4,926,182 A | 5/1990 | Ohta et al. | |
| 4,935,962 A | 6/1990 | Austin | |
| 4,963,887 A | 10/1990 | Kawashima | |
| 5,023,866 A | 6/1991 | DeMuro | |
| 5,035,563 A | 7/1991 | Mezey | |
| 5,053,774 A * | 10/1991 | Schuermann et al. | 340/10.34 |
| 5,055,968 A | 10/1991 | Nishi et al. | |
| 5,079,411 A | 1/1992 | Lee | |
| 5,081,458 A | 1/1992 | Meunier | |
| 5,084,699 A | 1/1992 | DeMichele | |
| 5,119,099 A | 6/1992 | Haruyama et al. | |
| 5,121,407 A | 6/1992 | Partyka et al. | |
| 5,164,985 A | 11/1992 | Nysen et al. | |
| 5,182,570 A * | 1/1993 | Nysen et al. | 343/795 |
| 5,293,029 A | 3/1994 | Lijima | |
| 5,320,561 A * | 6/1994 | Cook et al. | 439/500 |
| 5,374,930 A * | 12/1994 | Schuermann | 342/42 |
| 5,444,444 A | 8/1995 | Ross | |
| 5,446,447 A * | 8/1995 | Carney et al. | 340/572.4 |
| 5,448,110 A | 9/1995 | Tuttle et al. | |
| 5,450,086 A * | 9/1995 | Kaiser | 342/42 |
| 5,465,099 A | 11/1995 | Mitsui et al. | |
| 5,467,099 A * | 11/1995 | Bonebright et al. | 343/767 |
| 5,491,484 A * | 2/1996 | Schuermann | 342/51 |
| 5,491,715 A * | 2/1996 | Flaxl | 375/344 |
| 5,512,910 A | 4/1996 | Murakami et al. | |
| 5,528,222 A * | 6/1996 | Moskowitz et al. | 340/572.7 |
| 5,537,105 A * | 7/1996 | Marsh et al. | 340/10.32 |
| 5,555,286 A | 9/1996 | Tendler | |
| 5,557,254 A | 9/1996 | Johnson et al. | |
| 5,561,435 A * | 10/1996 | Nalbandian et al. | 343/700 MS |
| 5,572,226 A | 11/1996 | Tuttle | |
| 5,598,169 A | 1/1997 | Drabeck | |
| 5,606,323 A | 2/1997 | Heinrich et al. | |
| 5,617,060 A | 4/1997 | Wilson et al. | |
| 5,621,412 A | 4/1997 | Sharpe et al. | |
| 5,649,295 A | 7/1997 | Shober et al. | |
| 5,649,296 A | 7/1997 | MacLellan et al. | |
| 5,682,139 A | 10/1997 | Predeep et al. | |
| 5,682,143 A | 10/1997 | Brady et al. | |
| 5,701,121 A | 12/1997 | Murdoch | |
| 5,726,630 A * | 3/1998 | Marsh et al. | 340/10.2 |
| 5,742,509 A | 4/1998 | Goldberg et al. | |
| 5,745,036 A | 4/1998 | Clare | |
| 5,771,021 A | 6/1998 | Veghte | |
| 5,790,946 A | 8/1998 | Rotzoll | |
| 5,818,021 A | 10/1998 | Szewczykoski | |
| 5,838,235 A | 11/1998 | Thorigne | |
| 5,842,118 A | 11/1998 | Wood, Jr. | |
| 5,850,187 A | 12/1998 | Carrender et al. | |
| 5,852,421 A | 12/1998 | Maldonado | |
| 5,889,478 A | 3/1999 | Minesi | |
| 5,892,441 A | 4/1999 | Woolley et al. | |
| 5,894,266 A | 4/1999 | Wood et al. | |
| 5,900,808 A * | 5/1999 | Lebo | 340/442 |
| 5,901,211 A | 5/1999 | Dean et al. | |
| 5,907,286 A | 5/1999 | Kuma | |
| 5,917,433 A | 6/1999 | Keillor et al. | |
| 5,923,298 A * | 7/1999 | Miyahara et al. | 343/713 |
| 5,942,977 A | 8/1999 | Palmer et al. | |
| 5,943,624 A | 8/1999 | Fox et al. | |
| 5,959,357 A | 9/1999 | Korman | |
| 5,995,898 A | 11/1999 | Tuttle | |
| 6,010,074 A | 1/2000 | Kelly et al. | |
| 6,028,564 A * | 2/2000 | Duan et al. | 343/818 |
| 6,037,907 A * | 3/2000 | Ha et al. | 343/752 |
| 6,040,745 A | 3/2000 | Tanaka et al. | |
| 6,049,745 A | 4/2000 | Douglas et al. | |
| 6,057,779 A | 5/2000 | Bates | |
| 6,122,494 A | 9/2000 | Tuttle | |
| 6,130,602 A * | 10/2000 | O'Toole et al. | 340/10.33 |
| 6,144,301 A | 11/2000 | Frieden | |
| 6,177,872 B1 | 1/2001 | Kodukula et al. | |
| 6,184,841 B1 * | 2/2001 | Shober et al. | 343/853 |
| 6,236,836 B1 | 5/2001 | Westman et al. | |
| 6,239,765 B1 * | 5/2001 | Johnson et al. | 343/795 |
| 6,243,012 B1 | 6/2001 | Shober | |
| 6,317,027 B1 * | 11/2001 | Watkins | 340/10.1 |
| 6,329,139 B1 | 12/2001 | Nova et al. | |
| 6,329,915 B1 | 12/2001 | Brady | |
| 6,331,825 B1 | 12/2001 | Ladner et al. | |
| 6,356,535 B1 | 3/2002 | Smith | |
| 6,362,737 B1 | 3/2002 | Rodgers et al. | |
| 6,411,212 B1 * | 6/2002 | Hecht et al. | 340/572.1 |
| 6,486,801 B1 | 11/2002 | Jones | |
| 6,535,107 B1 | 3/2003 | Bartz | |
| 6,574,454 B1 | 6/2003 | Tuttle | |
| 6,583,713 B1 | 6/2003 | Bates | |
| 6,611,691 B1 * | 8/2003 | Zhou et al. | 455/550.1 |
| 6,717,923 B1 | 4/2004 | Smith | |
| 6,738,025 B2 | 5/2004 | Carrender | |
| 6,774,762 B2 | 8/2004 | Bates | |
| 6,825,773 B1 | 11/2004 | O'Toole | |
| 6,885,353 B2 | 4/2005 | Kurihara | |
| 7,005,961 B2 | 2/2006 | Bates | |
| 7,006,048 B2 | 2/2006 | Chang | |
| 7,026,935 B2 | 4/2006 | Diorio et al. | |
| 7,075,901 B2 | 7/2006 | Smith | |
| 7,091,860 B2 | 8/2006 | Martinez de Velasco Cortina et al. | |
| 7,132,946 B2 | 11/2006 | Waldner et al. | |
| 7,253,715 B2 | 8/2007 | Bates | |
| 7,327,257 B2 | 2/2008 | Posamentier | |
| 2006/0202827 A1 | 9/2006 | Volpi et al. | |
| 2007/0018904 A1 | 1/2007 | Smith | |
| 2007/0273473 A1 | 11/2007 | Bates | |
| 2007/0285207 A1 | 12/2007 | Bates | |
| 2007/0285208 A1 | 12/2007 | Bates | |
| 2007/0285213 A1 | 12/2007 | Bates | |
| 2007/0290807 A1 | 12/2007 | Smith et al. | |
| 2009/0015407 A1 | 1/2009 | Tuttle | |
| 2009/0027168 A1 | 1/2009 | Tuttle | |
| 2009/0278688 A1 | 11/2009 | Tuttle | |
| 2009/0289771 A1 | 11/2009 | Tuttle | |

OTHER PUBLICATIONS

Sakamura, Ken, "TRON News Items for Jan. 2004," located at http://tronweb.super-nova.co.jp/tronnews04-1.html, Jan. 2004.

Tuttle, John R., U.S. Appl. No. 08/806,158, filed Feb. 25, 1997, now abandoned.

USPTO Transaction History of U.S. Appl. No. 09/389,534, filed Sep. 2, 1999, entitled "Remote Communication Devices, Radio Frequency Identification Devices, Wireless Communication Systems, Wireless Communication Methods, Radio Frequency Identification Device Communication Methods, and Methods of Forming a Remote Communication Device," now abandoned.

USPTO Transaction History of U.S. Appl. No. 11/847,611, filed Aug. 30, 2007, entitled "Remote Communication Devices, Radio Frequency Identification Devices, Wireless Communication Systems, Wireless Communication Methods, Radio Frequency Identification Device Communication Methods, and Methods of Forming a Remote Communication Device."

USPTO Transaction History of U.S. Appl. No. 09/389,534, filed Sep. 2, 1999, entitled "Remote Communication Devices, Radio Frequency Identification Devices, Wireless Communication Systems, Wireless Communication Methods, Radio Frequency Identification Device Communication Methods, and Methods of Forming a Remote Communication Device," now abandoned.

USPTO Transaction History of U.S. Appl. No. 11/847,611, filed Aug. 30, 2007, entitled "Remote Communication Devices, Radio Frequency Identification Devices, Wireless Communication Systems, Wireless Communication Methods, Radio Frequency Identification Device Communication Methods, and Methods of Forming a Remote Communication Device."

Intellikey Corporation Web Page, Mar. 3, 1997.

Tuttle, John, "Digital RF/ID Enhances GPS," Proceedings of the Second Annual Wireless Symposium, pp. 406-411, Feb. 15, 1994.

Chartered Semiconductor Manufacturing, "Toppan Announces Volume Production of Next Generation RFID Chip," press release, Jul. 8, 2003.

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004.

Sakamura, Ken, "TRON News Items for Jan. 2004," located at http://tronweb.super-nova.co.jp/tronnews04-1.html, Jan. 2004.

Turner, Chris, "Backscatter Modulation of Impedance Modulated RFID Tags," located at www.rfip.eu/ backscatter_tag_link_budget_and_modulation_at_reader_receiver.pdf, Feb. 2003.

Tuttle, John R., U.S. Appl. No. 08/806,158 entitled "System for Locating an Individual in a Facility," filed Feb. 25, 1997, now abandoned.

* cited by examiner

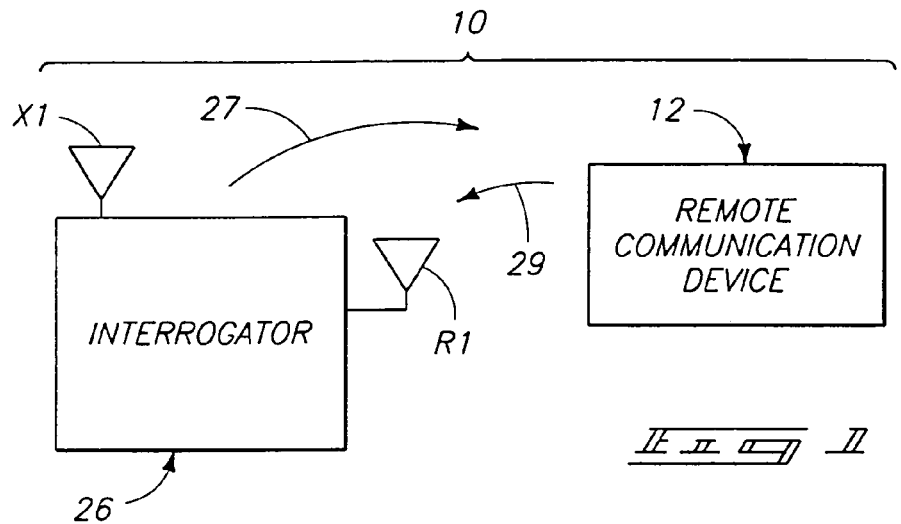
FIG. 1
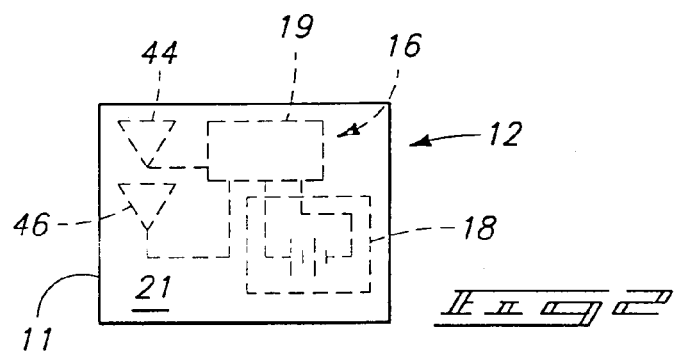
FIG. 2
FIG. 3
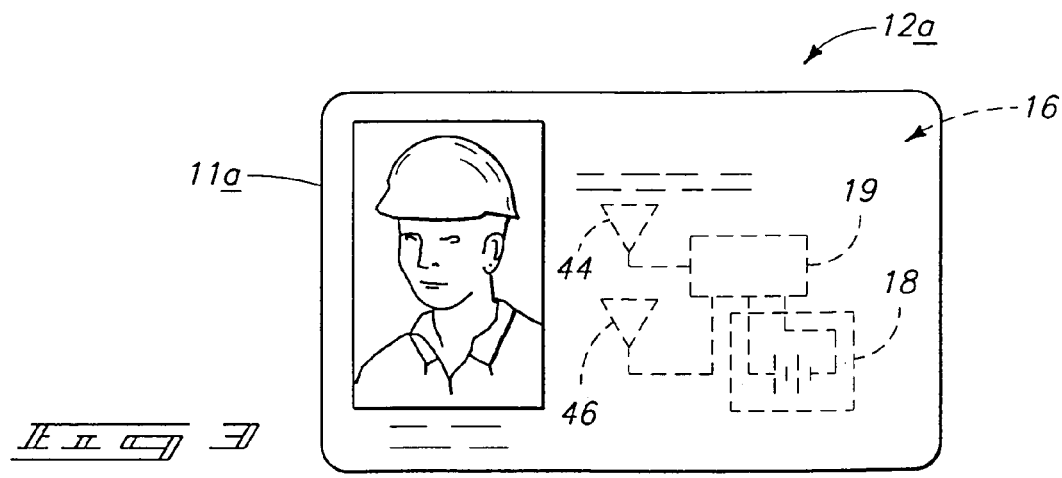

REMOTE COMMUNICATION DEVICES, RADIO FREQUENCY IDENTIFICATION DEVICES, WIRELESS COMMUNICATION SYSTEMS, WIRELESS COMMUNICATION METHODS, RADIO FREQUENCY IDENTIFICATION DEVICE COMMUNICATION METHODS, AND METHODS OF FORMING A REMOTE COMMUNICATION DEVICE

RELATED PATENT DATA

This patent resulted from a continuation application of and claims priority to U.S. patent application Ser. No. 09/389,534, filed Sep. 2, 1999 now abandoned entitled "Remote Communication Devices, Radio Frequency Identification Devices, Wireless Communication Systems, Wireless Communication Methods, Radio Frequency Identification Device Communication Methods, and Methods of Forming a Remote Communication Device", naming Freddie W. Smith et al. as inventors, the disclosure of which is incorporated by reference.

TECHNICAL FIELD

The present invention relates to remote communication devices, radio frequency identification devices, wireless communication systems, wireless communication methods, radio frequency identification device communication methods, and methods of forming a remote communication device.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application, and incorporated herein by reference. This application discloses the use of a radio frequency (RF) communication system including communication devices. The disclosed communication devices include an interrogator and a remote transponder, such as a tag or card.

Such communication systems can be used in various applications such as identification applications. The interrogator is configured to output a polling or interrogation signal which may comprise a radio frequency signal including a predefined code. The remote transponders of such a communication system are operable to transmit an identification signal responsive to receiving an appropriate polling or interrogation signal.

More specifically, the appropriate transponders are configured to recognize the predefined code. The transponders receiving the code can subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is initially attached to an object of interest. Responsive to receiving the appropriate polling signal, the identification device is equipped to output an identification signal. Generating the identification signal identifies the presence or location of the identification device and the article or object attached thereto.

Some conventional electronic identification systems utilize backscatter communication techniques. More specifically, the interrogator outputs a polling signal followed by a continuous wave (CW) signal. The remote communication devices are configured to modulate the continuous wave signal in backscatter communication configurations. This modulation typically includes selective reflection of the continuous wave signal. The reflected continuous wave signal includes the reply message from the remote devices which is demodulated by the interrogator.

SUMMARY OF THE INVENTION

The present invention relates to remote communication devices, radio frequency identification devices, wireless communication systems, wireless communication methods, radio frequency identification device communication methods, and methods of forming a remote communication device.

According to one aspect of the invention, a wireless communication system is provided. The wireless communication system comprises an interrogator and one or more remote communication devices individually configured to communicate with the interrogator in at least one embodiment. Exemplary remote communication devices include remote intelligent communication devices or radio frequency identification devices (RFID).

One configuration of the remote communication device includes communication circuitry and at least one antenna configured to communicate at a plurality of frequencies. The antenna is substantially tuned to plural frequencies to implement communications. The remote communication device includes a transmit antenna and receive antenna in one embodiment. An exemplary transmit antenna comprises a dipole antenna and an exemplary receive antenna comprises a loop antenna. The remote communication device is configured for backscatter communications in at least one arrangement.

The invention additionally provides methods and additional structural aspects as described below.

BRIEF DESCRIPTION OF THE DRAWINGS

Preferred embodiments of the invention are described below with reference to the following accompanying drawings.

FIG. 1 is a functional block diagram of an exemplary communication system.

FIG. 2 is a front view of a wireless remote communication device according to one embodiment of the invention.

FIG. 3 is a front view of an employee badge according to another embodiment of the invention.

DETAILED DESCRIPTION OF THE PREFERRED EMBODIMENTS

Figure 4:
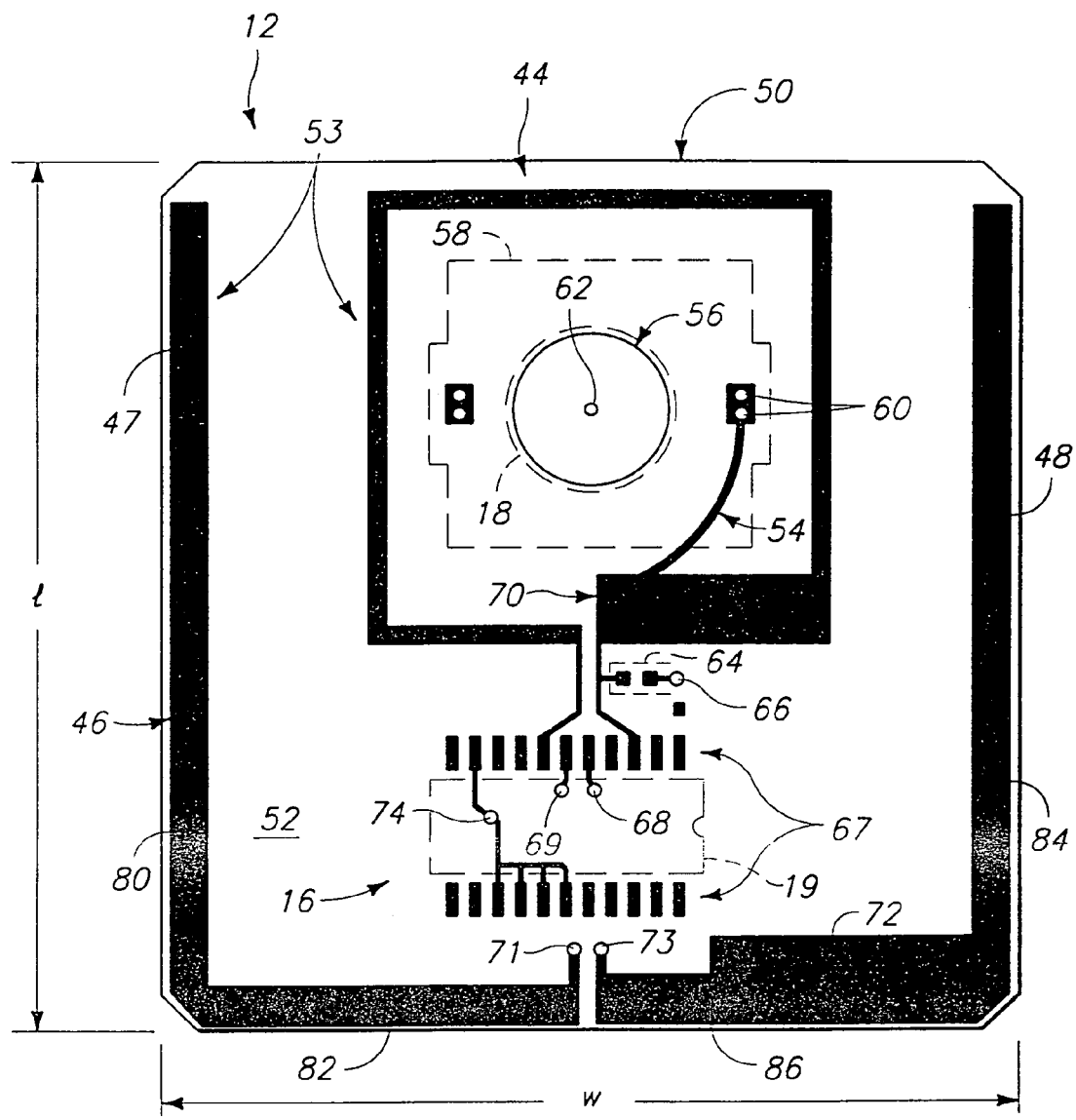
FIG. 4 is an illustrative representation of one substrate surface of a remote communication device.

This disclosure of the invention is submitted in furtherance of the constitutional purposes of the U.S. patent Laws "to promote the progress of science and useful arts" (Article 1, Section 8).

FIG. 1 illustrates a wireless communication system 10 embodying the invention. Communication system 10 is configured as an electronic identification system in the embodiment described herein. Other applications of communication system 10 are possible. Further, the described communication system 10 is configured for backscatter communications as described further below. Other communication protocols are utilized in other embodiments.

The depicted communication system 10 includes at least one electronic wireless remote communication device 12 and an interrogator 26. Radio frequency communications can occur intermediate remote communication device 12 and interrogator 26 for use in identification systems and product monitoring systems as exemplary applications.

Devices 12 include radio frequency identification devices (RFID) or remote intelligent communication (RIC) devices in the exemplary embodiments described herein. Remote intelligent communication devices can perform functions in addition to identification functions. Exemplary devices 12 are disclosed in U.S. patent application Ser. No. 08/705,043, filed Aug. 29, 1996. Plural wireless remote communication devices 12 typically communicate with interrogator 26 although only one such device 12 is illustrated in FIG. 1. Such a remote communication device 12 can be referred to as a tag or card as illustrated and described below.

Although multiple remote communication devices 12 can be employed in communication system 10, there is typically no communication between multiple devices 12. Instead, the multiple communication devices 12 communicate with interrogator 26. Multiple communication devices 12 can be used in the same field of interrogator 26 (i.e., within the communications range of interrogator 26). Similarly, multiple interrogators 26 can be in proximity to one or more of remote communications devices 12.

The above described system 10 is advantageous over prior art devices that utilize magnetic field effect systems because, with system 10, a greater range can be achieved, and more information can be communicated (instead of just identification information). As a result, such a system 10 can be used, for example, to monitor large warehouse inventories having many unique products needing individual discrimination to determine the presence of particular items within a large lot of tagged products.

Remote communication device 12 is configured to interface with Interrogator 26 using a wireless medium in one embodiment. More specifically, communications intermediate communication device 12 and interrogator 26 occur via an electromagnetic link, such as an RF link (e.g., at microwave frequencies) in the described embodiment. Interrogator 26 is configured to output forward link wireless communications 27. Further, interrogator 26 is operable to receive reply or return link wireless communications 29 from remote communication devices 12 responsive to the outputting of forward link communication 27.

In accordance with the above, forward link communications 27 and return link communications 29 individually comprise wireless signals, such as radio frequency signals, in the described embodiment. Other forms of electromagnetic communication, such as infrared, etc., are possible.

Interrogator unit 26 includes a plurality of antennas X1, R1, as well as transmitting and receiving circuitry, similar to that implemented in devices 12. Antenna X1 comprises a transmit antenna and antenna R1 comprises a receive antenna individually connected to interrogator 26.

In operation, interrogator 26 transmits the interrogation command or forward link communication signal 27 via antenna X1. Communication device 12 is operable to receive the incoming forward link signal. Upon receiving signal 27, communication device 12 is operable to respond by communicating the responsive reply or return link communication signal 29.

In one embodiment, responsive signal 29 is encoded with information that uniquely identifies, or labels the particular device 12 that is transmitting, so as to identify any object, animal, automobile, person, etc., with which remote communication device 12 is associated.

More specifically, remote communication device 12 is configured to output an identification signal within reply link communication 29 responsive to receiving forward link wireless communication 27. Interrogator 26 is configured to receive and recognize the identification signal within the return or reply link communication 29. The identification signal can be utilized to identify the particular transmitting communication device 12.

Referring to FIG. 2, one embodiment of remote communication device 12 is illustrated. The depicted remote communication device 12 includes communication circuitry 16 having a receiver and a transmitter. Communication circuitry 16 may be implemented as transponder circuitry in one configuration. Exemplary communication circuitry 16 includes a small outline integrated circuit (SOIC) 19 available as radio frequency identification device (RFID) circuitry from Micron Communications Inc., 3176 South Denver Way, Boise, Id. 83705 under the trademark MicroStamp™ Engine and having designations MSEM256X10SG, MT59RC256R1FG-5.

Communication circuitry 16 is configured to receive and process communication signals. Exemplary processing includes analyzing the received communication signal for identification information and processing commands within the communication signal. More or less processing can be performed by communication circuitry 16. Thereafter, communication circuitry 16 selectively generates communication signals for communication to interrogator 26. Remote communication device 12 further includes a power source 18 connected to communication circuitry 16 to supply operational power to communication circuitry 16 including integrated circuit 19.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size, and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communication device 12 further includes at least one antenna connected to communication circuitry 16 and configured for at least one of wireless transmission and reception. In the illustrated embodiment, communication device 12 includes at least one receive antenna 44 connected to communication circuitry 16 for radio frequency reception by communication circuitry 16, and at least one transmit antenna 46 connected to communication circuitry 16 for radio frequency transmission by communication circuitry 16.

Receive antenna 44 is configured to receive forward wireless signals 27 and apply communication signals corresponding to the received wireless signals to communication circuitry 16. Transmit antenna 46 is configured to receive generated communication signals from communication circuitry 16 and output remote wireless signals 29 corresponding to the generated communication signals. The described antennas are implemented as printed microstrip antennas in one configuration. Further, receive antenna 44 comprises a loop antenna and the transmit antenna 46 comprises a dipole antenna in the described configuration. Transmit antenna 46 has plural dipole halves 47, 48 in the configuration illustrated in FIG. 4.

Communication device 12 can be included in any appropriate housing or packaging. FIG. 2 shows but one example of a housing in the form of a miniature housing 11 encasing device 12 to define a tag which can be supported by an object (e.g., hung from an object, affixed to an object, etc.).

Referring to FIG. 3, an alternative configuration of remote communication device 12a is illustrated. FIG. 3 shows remote communication device 12a having a housing 11a in the form of a card. Card housing 11a preferably comprises plastic or other suitable material. Remote communication device 12a may be utilized as an employee identification badge including the communication circuitry 16. In one embodiment, the front face of housing 11a has visual identification features such as an employee photograph or a fingerprint in addition to identifying text.

Although two particular types of housings have been disclosed, the communication device 12 can be included in any appropriate housing. Communication device 12 is preferably of a small size that lends itself to applications employing small housings, such as cards, miniature tags, etc. Larger housings can also be employed. The communication device 12, provided in any appropriate housing, can be supported from or attached to an object in any desired manner.

Referring to FIG. 4, further details of one configuration of remote communication device 12 are shown. The illustrated remote communication device 12 includes a substrate 50 having plural surfaces (surface 52 is shown in FIG. 4). The illustrated substrate 50 has exemplary dimensions including a length l of 60 mm and a width w of 53 mm.

In the described configuration of remote communication device 12, substrate 50 comprises FR4 board. Conductive traces 53 are provided upon surface 52 of substrate 50 to form desired circuitry including interconnections, antennas, etc. Such traces 53 can be formed by etching copper cladding provided upon surface 52.

As shown, conductive traces 53 include receive antenna 44 and transmit antenna 46 individually formed upon surface 52. In addition, traces 53 include power source connections for coupling with power source 18 (shown in phantom in FIG. 3). More specifically, power source connections include a positive voltage connection 54 and a negative voltage connection 56 as shown.

A negative terminal of power source 18 may be electrically coupled directly with negative connection 56. In the described configuration, power source 18 is seated upon and coupled directly above negative connection 56.

An elevated support connection 58 is formed elevationally above power source 18 and substrate surface 52. Elevated support connection 58 is coupled with a positive terminal of power source 18. The positive terminal can be opposite the negative terminal of power source 18 which is coupled with negative connector 56. Plural conductive posts 60 are provided to couple elevated support connection 58 with positive connection 54.

A via connection 62 is shown formed through substrate 50. Via connection 62 provides coupling of negative connection 56 formed upon surface 52 to an opposing surface of substrate 50 shown in FIG. 8. Via connection 62 can provide coupling to a ground plane formed upon the opposing surface as described below in further detail. Positive connection 54 couples conductive posts 60 with receive antenna 44 and a pin 3 (positive voltage input) of integrated circuit 19. Antenna 44 is additionally coupled with a pin 7 (RX input) of integrated circuit 19 as shown.

Conductive traces 53 formed upon surface 52 also couple communication circuitry 16 and a capacitor 64 with other circuitry as illustrated. Capacitor 64 is coupled with one lead of receive antenna 44 and a via connection 66. Via connection 66 provides electrical coupling of capacitor 64 with a ground connection upon the opposing surface of substrate 50. Accordingly, capacitor 64 operates to provide coupling of positive connection 54 with the ground reference voltage of power source 18. Capacitor 64 is a 0.1 microfarad capacitor in the described embodiment sufficient to provide static discharge protection.

The formed conductive traces 53 also operate to couple the lead of receive antenna 44 with pin 7 of integrated circuit 19. Pins 5, 6 of integrated circuit 19 are coupled with respective via connections 68, 69. Via connections 68, 69 provide electrical connection through substrate 50 to a transmission line described with reference to FIG. 8. Via connections 71, 73 are coupled with opposite ends of the transmission line and dipole halves 47, 48 of transmit antenna 46. Integrated circuit 19 is electrically coupled with a plurality of pin connections 67 of conductive traces 53. Plural pins 9, 13-16 of integrated circuit 19 are coupled with a via connection 74 which is coupled through the ground plane to the negative terminal of power source 18.

In the illustrated configuration including power source 18 within receive antenna 44, receive antenna 44 is tuned to a first frequency (approximately 915 MHz in the described embodiment). Power source 18 provides capacitive loading which assists with tuning of antenna 44 to the desired frequency.

Receive antenna 44 further includes an impedance reduction strip 70 provided in a substantially rectangular configuration in the depicted embodiment. Other configurations of impedance reduction strip 70 are possible. Impedance reduction strip 70 comprises a conductor which operates to effectively lower the impedance of receive antenna 44 and provide enhanced operation of antenna 44 at another higher frequency (e.g., 2.45 GHz) without excessive degradation of communication at the first frequency (e.g., 915 MHz).

Thus, with impedance reduction strip 70, receive antenna 44 is substantially tuned to a plurality of independent frequency bands individually having a bandwidth of approximately twenty percent of the highest center frequency (e.g., +/−200 MHz for 2.45 GHz). Receive antenna 44 is tuned to plural exclusive non-overlapping frequency bands in the described arrangement. Receive antenna 44 is configured to communicate wireless signals at a plurality of substantially resonant frequencies. More specifically, the illustrated configuration of receive antenna 44 can electromagnetically communicate with a return loss of less than or equal to approximately −9 dB at the plural frequencies.

The illustrated configuration of transit antenna 46 includes plural vertical portions and horizontal portions. More specifically, dipole half 47 includes a vertical portion 80 and a horizontal portion 82. Dipole half 48 includes a vertical portion 84 and a horizontal portion 86.

Additionally, transmit antenna 46 includes an impedance reduction strip 72 formed in one exemplary configuration as illustrated in FIG. 4. Impedance reduction strip 72 is a conductor formed adjacent one of the leads of transmit antenna 46. Impedance reduction strip 72 operates to reduce the impedance of dipole half 48 of transmit antenna 46 in the depicted configuration. Other arrangements for impedance reduction strip 72 are possible.

The illustrated transmit antenna 46 is configured to communicate wireless signals at a plurality of substantially resonant frequencies. Transmit antenna 46 is substantially tuned to a plurality of independent frequency bands individually having a bandwidth of approximately twenty percent of the highest center frequency. Transmit antenna 46 is tuned to plural exclusive non-overlapping frequency bands in the described arrangement.

For example, the depicted transmit antenna 46 is substantially tuned to 915 MHz and 2.45 GHz. Horizontal portions 82, 86 of transmit antenna 46 are tuned to substantially communicate at a first frequency (e.g., 2.45 GHz communications). Vertical portions 80, 84 of transmit antenna 46 in combination with horizontal portions 82, 86 are tuned to provide communications at a second frequency (e.g., 915 MHz) with horizontal portions 82, 86. Transmit antenna 46 is configured to electromagnetically communicate with a return loss of less than or equal to approximately −9 dB at the plurality of frequencies. Provision of impedance reduction strip 72 operates to improve tuning of transmit antenna 46 to the plural independent frequency bands.

Interrogator 26 (shown in FIG. 1) is configured to communicate at one or more of a plurality of frequencies. The frequency of communication intermediate interrogator 26 and remote communication device 12 is generally controlled by interrogator 26. For example, in some applications, a 915 MHz frequency may be desirable for longer range communications while in other applications a 2.45 GHz frequency may provide advantageous benefits (e.g., severe interference may be experienced in another one of the frequency bands). Interrogator 26 outputs forward signals 27 at the desired frequency or frequencies.

Thereafter, interrogator 26 outputs a continuous wave signal at one or more of the frequencies. Remote communication device 12 selectively modulates a received continuous wave signal during backscatter communications. Accordingly, the modulated backscatter return signal is provided at the original frequency of the continuous wave signal outputted by interrogator 26. Thus, in the described embodiment, the frequency of communication of remote communication device 12 is determined responsive to a frequency of communication of interrogator 26. Other communication methods may be utilized.

Figure 6:
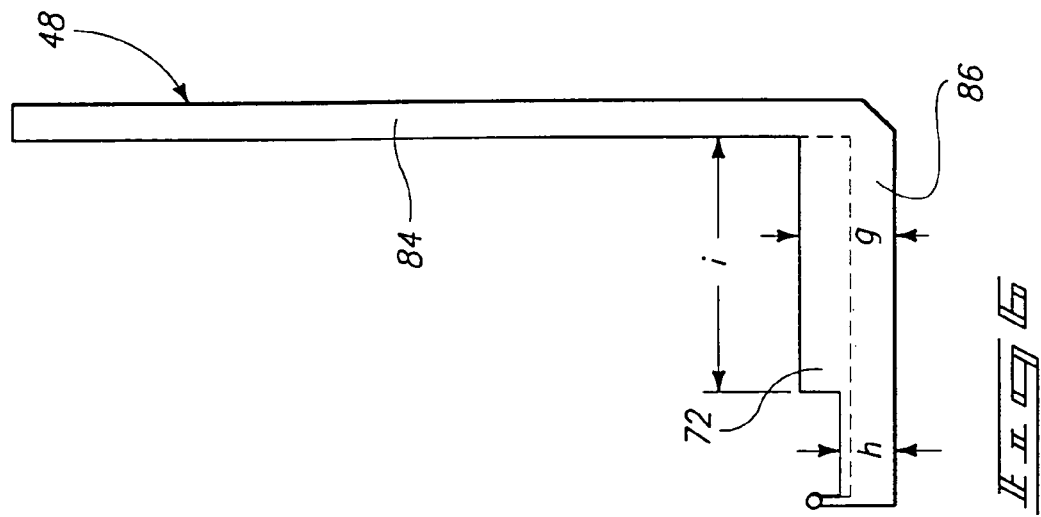
FIG. 6 is an illustrative representation of additional exemplary dimensions of the transmit antenna.
Figure 5:
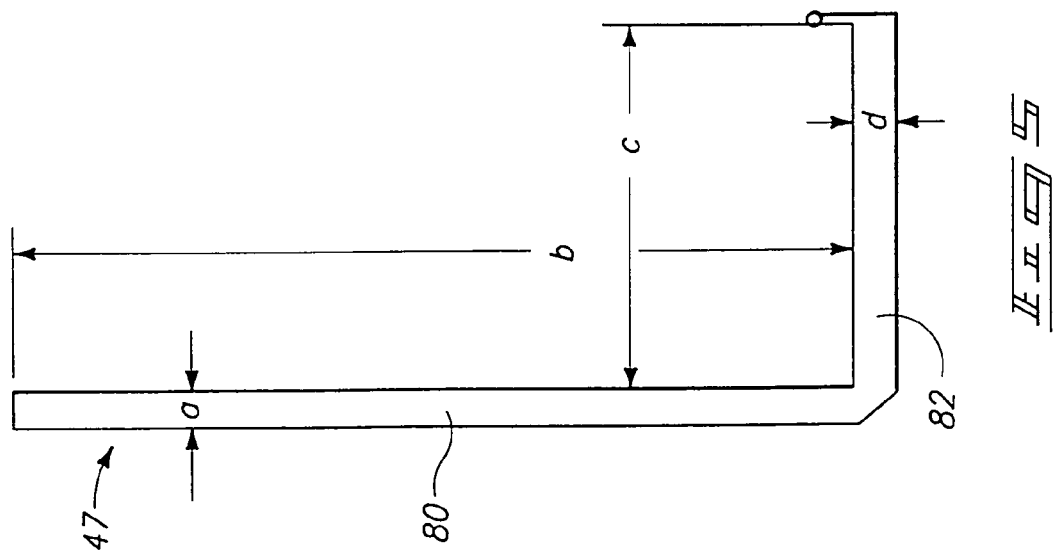
FIG. 5 is an illustrative representation of exemplary dimensions of a transmit antenna of the remote communication device.
Figure 7:
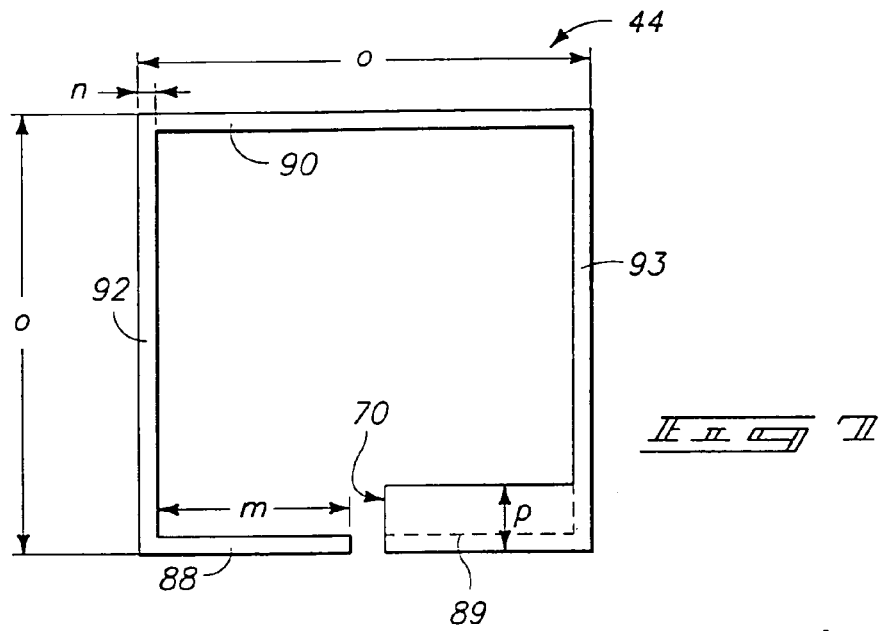
FIG. 7 is an illustrative representation of exemplary dimensions of a receive antenna of the remote communication device.

Referring to FIGS. 5-7, exemplary dimensions of receive antenna 44 and transmit antenna 46 formed upon surface 52 are illustrated. Referring specifically to FIG. 5, dipole half 47 of transmit antenna 46 is shown. Vertical portion 80 of dipole half 47 has a thickness a of 2.3 mm. Vertical portion 80 additionally includes a length b of 55 mm. Horizontal portion 82 has a length c of 22.3 mm. Horizontal portion 82 additionally includes a width d of 3 mm.

Referring to FIG. 6, details of dipole half 48 are shown. Dipole half 48 includes a vertical portion 84 and a horizontal portion 86 adjacent impedance reduction strip 72. Vertical portion 84 has an equivalent width and length to that of vertical portion 80 of antenna half 47. Further, horizontal portion 86 has a length equivalent to that of horizontal portion 82 of antenna half 47. A dimension g including the width of horizontal portion 86 and the width of impedance reduction strip 72 is 7.73 mm. Another dimension h including a reduced width of impedance reduction strip 72 and horizontal portion 86 is 5 mm. Further, a dimension i corresponding to one length of impedance reduction strip 72 is 17 mm. The depicted dimensions correspond to one configuration of transmit antenna 46 of remote communication device 12. Other configurations are possible.

Referring to FIG. 7, exemplary dimensions of receive antenna 44 are shown. Receive antenna 44 includes horizontal portions 88-90. In addition, receive antenna 44 includes vertical portions 92, 93. Horizontal portions 88, 89 individually have a length corresponding to a dimension m of 14.7 mm. Individual antenna portions 88-90, 92, 93 individually have a width corresponding to dimension n of 1.35 mm. Vertical portions 92, 93 individually have a length o having a dimension of 33.8 mm. Horizontal portion 90 also has a length of dimension o of 33.8 mm. Impedance reduction strip 70 and horizontal portion 89 have a combined width p of 5.73 mm.

Figure 8:
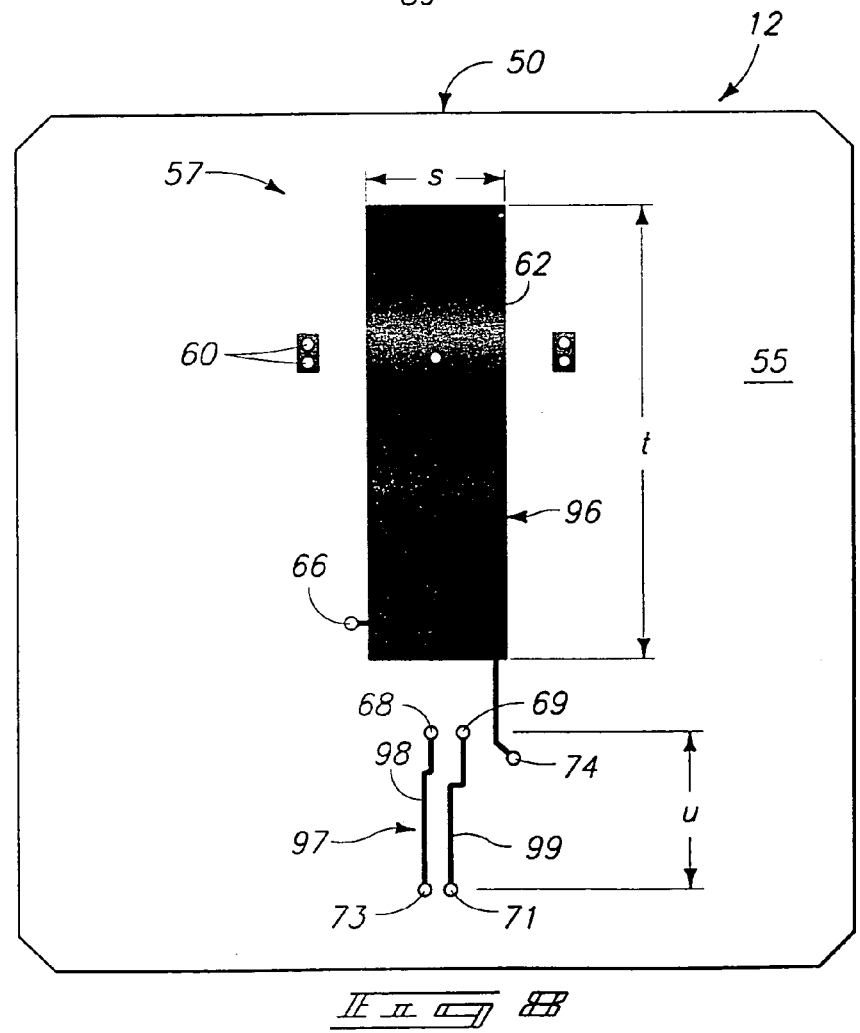
FIG. 8 is an illustrative representation of an exemplary conductive trace formed upon another substrate surface of the remote communication device.

Referring to FIG. 8, a surface 55 of substrate 50 opposite surface 52 described above is shown. Surface 55 of substrate 50 includes conductive traces 57 formed as shown in the described embodiment. Conductive traces 57 can comprise etched copper cladding in an FR4 board configuration.

The depicted conductive trace 57 includes a ground plane 96 and a transmission line 97 comprising plural conductors 98, 99. Ground plane 96 is coupled with negative connection 56 using via connection 62. Further, ground plane 96 is also coupled with via connections 66, 74.

Transmission line 97 comprises a quarter-wavelength transmission line in the described embodiment. Transmission line 97 operates to couple backscatter pins 5, 6 of integrated circuit 19 shown in FIG. 4 with respective dipole halves 48, 47 of transmit antenna 46. Transmission line 97 operates to provide an inverting function in accordance with the described embodiment. For example, if integrated circuit 19 short circuits pins coupled with via connections 68, 69, an open circuit is seen at via connections 71, 73 coupled with antenna halves 47, 48. Conversely, if an open circuit is provided intermediate via connections 68, 69, a short circuit is seen at via connections 71, 73 for 2.45 GHz communications.

Various dimensions of conductive trace 57 are provided below in accordance with an exemplary configuration. Other configurations are possible. In the described embodiment, ground plane 96 includes a width of dimension s of 8.44 mm. Further, ground plane 96 has a length t of 34 mm. Conductors 98, 99 individually have a length corresponding to dimension u of 10.5 mm. Further, individual conductors 98, 99 have a width of 1 mm.

Provision of a remote communication device 12 as described herein provides improved communications at plural independent frequency bands. For example, such a remote communication device 12 has been observed to have a forward range of approximately 170 feet and a return range of approximately 300 feet at 915 MHz. Further, the remote communication device has been observed to have a forward range of 28 feet and a return range of 90 feet at 2.45 GHz.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A remote communication device comprising:
   communication circuitry configured to at least one of receive communication signals and generate communication signals; and
   an antenna coupled with the communication circuitry, the antenna including a first portion, a second portion and an impedance reduction portion, the first portion to substantially tune the antenna to a first frequency band, the first and second portions to tune the antenna simultaneously to a second frequency band different from the first frequency band, the impedance reduction portion coupled to the first and second portions to facilitate tuning to the first and second frequency bands.

2. The remote communication device of claim 1, wherein the antenna comprises a microstrip antenna.

3. The remote communication device of claim 1, wherein the antenna is configured to electromagnetically communicate with a return loss of less than or equal to approximately −9 dB within the first and second frequency bands.

4. The remote communication device of claim 1, further comprising a power source coupled with the communication circuitry.

5. The remote communication device of claim 1, wherein the antenna is configured to output the wireless signals, and the remote communication device further comprises another antenna coupled with the communication circuitry and substantially tuned to first and second different frequency bands, the another antenna being configured to receive the wireless signals.

6. The remote communication device of claim 1, wherein the antenna is configured to communicate via backscatter modulation.

7. The remote communication device of claim 5, further comprising a quarter-wavelength transmission line coupled intermediate the communication circuitry and the antenna.

8. The remote communication device of claim 1, wherein the communication circuitry comprises radio frequency identification device circuitry 9. The remote communication device of claim 1, wherein the frequency bands are centered at approximately 915 MHz and 2.45 GHz.

10. The remote communication device of claim 1, wherein the first and second portions of the antenna are substantially symmetric.

11. A remote communication device comprising:
    communication circuitry configured to at least one of receive communication signals and generate communication signals;
    an antenna coupled with the communication circuitry, the antenna having a plurality of substantially resonant frequencies and an impedance reduction strip integrated within a frequency tuning portion of the antenna; and
    a quarter-wavelength transmission line coupled intermediate the communication circuitry and the antenna.

12. The remote communication device of claim 11, wherein the antenna is substantially tuned to the resonant frequencies.

13. The remote communication device of claim 11, wherein the antenna is configured to electromagnetically communicate with a return loss of less than or equal to approximately −9 dB at the resonant frequencies.

14. The remote communication device of claim 11, wherein the antenna is configured to output the wireless signals, and further comprising another antenna coupled with the communication circuitry and configured to receive the wireless signals at a plurality of substantially resonant frequencies.

15. The remote communication device of claim 14, wherein the antenna is configured to communicate via backscatter modulation.

16. The remote communication device of claim 11, wherein the antenna comprises a dipole antenna with a return loss of less than −9 dB at the resonant frequencies.

17. The remote communication device of claim 11, wherein the communication circuitry comprises radio frequency identification device circuitry.

18. A radio frequency identification (RFID) device comprising:
    communication circuitry configured to receive communication signals and generate communication signals according to an identification code stored to identify the RFID device; and
    at least one antenna coupled with the communication circuitry, the at least one antenna to simultaneously tune to a plurality of frequency bands including a first frequency band and a second frequency band, wherein a center frequency of the second frequency band is at least twice a center frequency of the first frequency band.

19. The RFID device of claim 18, wherein the antenna is configured to receive the wireless signals, and further comprising another antenna coupled with the communication circuitry and substantially tuned to a plurality of frequencies, the another antenna being configured to output the wireless signals.

20. The RFID device of claim 19, wherein the another antenna is configured to communicate via backscatter modulation.

21. The RFID device of claim 18, wherein the antenna includes an impedance reduction conductor.

22. A radio frequency identification (RFID) device comprising:
    communication circuitry configured to receive forward signals from an interrogator and generate return signals according to an identification code stored to identify an object to which the RFID device is attached; and
    an antenna coupled with the communication circuitry and configured to communicate wireless signals at one of a plurality of frequencies including at least one of receiving the forward signals and outputting the return signals;
    wherein the antenna is simultaneously substantially tuned to the frequencies, but not tuned to at least one frequency between two of the plurality of frequencies, at a moment in time.

23. The RFID device of claim 22, wherein the antenna is configured to communicate at one frequency responsive to a frequency of communication of the interrogator.

24. The RFID device of claim 22, wherein the antenna is configured to receive the forward signals, and further comprising another antenna coupled with the communication circuitry and configured to output the return signals at one of a plurality of frequencies.

25. The RFID device of claim 24, wherein the another antenna is configured to communicate via backscatter modulation.

26. The RFID device of claim 22, wherein the impedance reduction conductor tunes the antenna to one of the frequencies.

27. A wireless communication method comprising:
    providing a remote communication device having an antenna simultaneously substantially tuned to first and second different frequency bands; and communicating wireless signals using the antenna, including at least one of:
    receiving wireless signals at a frequency within one of the frequency bands, and
    outputting wireless signals at a frequency within one of the frequency bands;
    wherein the antenna is not tuned to at least one frequency between the first and the second different frequency bands, and the antenna includes an impedance reduction strip integrated within the antenna to facilitate tuning to the first and second frequency bands.

28. The method of claim 27, wherein the providing comprises providing a remote communication device having the antenna configured to electromagnetically communicate with a return loss of less than or equal to approximately −9 dB within the first and second frequency bands.

29. The method of claim 27, wherein the providing comprises providing a remote communication device having a plurality of antennas individually substantially tuned to first and second different frequency bands.

30. The method of claim 29, wherein the communicating comprises receiving using one of the antennas and outputting using another of the antennas.

31. The method of claim 27, further comprising processing wireless signals using the remote communication device.

32. The method of claim 27, wherein the providing comprises providing a radio frequency identification device.

33. A radio frequency identification (RFID) device communication method comprising:
    affixing a RFID device to an object to wirelessly identify the object via wireless signals at a plurality of frequencies using at least one antenna of the RFID device, the at least one antenna being simultaneously substantially tuned to the frequencies but not tuned to at least one frequency between two of the plurality of frequencies;
    receiving forward signals at one of the frequencies; and
    outputting return signals at one of the frequencies.

34. The method of claim 33, wherein the providing comprises providing the RFID device having the one antenna configured to output the return signals.

35. The method of claim 33, further comprising processing wireless signals using the RFID device.

36. The method of claim 33, wherein the receiving and outputting occur at the same frequency.

37. A method of forming a radio frequency identification (RFID) device comprising:
    providing communication circuitry configured to at least one of receive forward signals and output return signals;
    forming at least one antenna to simultaneously communicate at a plurality of resonant frequencies, the at least one antenna not tuned to at least one frequency between two of the plurality of resonant frequencies; and
    coupling the at least one antenna with the communication circuitry.

38. The method of claim 37, further comprising coupling a power source with the communication circuitry.

39. The method of claim 37, wherein the providing comprises providing RFID device communication circuitry.

40. The method of claim 37, wherein the coupling comprises coupling a plurality of antennas with the communication circuitry, one of the antennas being configured to receive wireless signals corresponding to the forward signals and the other of the antennas being configured to communicate wireless signals corresponding to the return signals.

41. The method of claim 37, wherein the coupling comprises coupling the at least one antenna comprising a dipole antenna.

42. The remote communication device of claim 1, wherein the antenna is substantially tuned to the first and second different frequency bands having different respective carrier frequencies.

43. The remote communication device of claim 1, wherein the antenna is configured to communicate at different substantially resonant frequencies corresponding to signals generated using at least one interrogator and which have different carrier frequencies.

44. The RFID device of claim 18, wherein the plurality of frequencies correspond to different carrier frequencies of the communication signals.

45. The RFID device of claim 22, wherein the frequencies comprise carrier frequencies of the forward and return signals.

46. The remote communication device of claim 1, wherein the communication circuitry is configured to control reflection, by the antenna, of electromagnetic energy present at the remote communication device to implement backscatter communications.

47. The remote communication device of claim 4, wherein the power source comprises a battery.

48. The RFID device of claim 18, wherein the at least one antenna comprises a first loop antenna and a second antenna.

49. The RFID device of claim 48, wherein a first loop antenna is configured to receive radio frequency wireless signals and the second antenna is configured to transmit radio frequency wireless signals.

50. The method of claim 37, wherein the at least one antenna comprises a first antenna and a second antenna.

51. The method of claim 50, wherein the first antenna is a loop antenna.

52. A radio frequency identification (RFID) device, comprising:
    a first loop antenna configured to operate at a first frequency;
    a second antenna configured to operate at a second frequency which is at least twice the first frequency; and
    a communication circuitry coupled to the first antenna and the second antenna, the communication circuitry comprising a transmitter and a receiver, the receiver configured to receive wireless radio frequency interrogation signals via one of the first antenna and the second antenna, and the transmitter configured to use one of the first antenna and the second antenna to modulate a radio continuous wave signal to provide, in response to the wireless signals, information that identifies the RFID device, wherein the continuous wave signal is provided by a separate device interrogating the RFID device.

53. The RFID device of claim 52, wherein the first antenna is configured to operate at a plurality of frequencies including the first frequency and the second frequency; and the second antenna is configured to operate at the plurality of frequencies including the first frequency and the second frequency.

54. The RFID device of claim 52, wherein the receiver is configured to use the first antenna to receive the wireless radio frequency interrogation signals; and the transmitter is configured to use the second antenna to modulate the continuous wave signal.

55. The RFID device of claim 52, wherein the RFID device is configured to communicate the information that identifies the RFID device without utilizing magnetic field effect.

56. The RFID device of claim 52, wherein the transmitter is configured to communicate with the separate device in one of a first communication mode and a second communication mode determined by the separate device, wherein in accordance with the first communication mode the RFID device modulates a radio frequency (RF) field generated by the RFID device and in accordance with the second communication mode the RFID device modulates an RF field generated by the separate device.

57. The RFID device of claim 52, wherein the transmitter is configured to transmit at a bit rate specified by the separate device.

58. The RFID device of claim 52, wherein the communication circuitry is configured to transition from a sleep state in response to a wake up command from the separate device.

59. The RFID device of claim 52, wherein the communication circuitry is configured to generate a random number to identify the RFID device.

60. The RFID device of claim 52, wherein the communication circuitry comprises an integrated circuit; and the first and second antennas are coupled to the integrated circuit.

61. The RFID device of claim 52, wherein the communication circuitry is configured to use the first loop antenna for a first communication range and to use the second antenna for a second communication range larger than the first communication range.

62. The RFID device of claim 52, wherein the first antenna is configured to operate in a first frequency band, and the second antenna is configured to operate in a second frequency band; wherein the first frequency band and the second frequency band are exclusive non-overlapping.

63. A radio frequency identification (RFID) device, comprising:
a first antenna and a second antenna configured to operate in a plurality of exclusive non-overlapping frequency bands; and
a communication circuitry coupled to the first antenna and the second antenna to receive and process radio frequency (RF) communication signals, the communication circuitry configured to receive the communication signals via one of the first antenna and the second antenna and, in response, to transmit identification signals via one of the first antenna and the second antenna, the identification signals to identify the RFID device via modulating an RF field generated by an interrogating device.

64. The RFID device of claim 63, wherein a central frequency of a first frequency band of the frequency bands is at least twice a central frequency of a second frequency band of the frequency bands.

65. The RFID device of claim 63, wherein the first antenna is configured to transmit signals in the first band; and the second antenna comprises a loop antenna configured to receive signals in the second band.

66. The RFID device of claim 65, wherein the communication circuitry is configured to use the first antenna to modulate a continuous wave signal in the RF field to transmit the identification signals.

67. The RFID device of claim 65, wherein the identification signals are transmitted without utilizing magnetic field effect.

68. The RFID device of claim 63, wherein the communication circuitry is configured to communicate with the interrogating device in one of an active mode and a passive mode, wherein in the active mode the RFID device modulates an RF field generated by the RFID device and in the passive mode the RFID device modulates an RF field generated by the interrogating device.

69. The RFID device of claim 63, wherein the communication circuitry is configured to transmit the identification signals at a bit rate specified by the interrogating device.

70. A radio frequency identification (RFID) method, comprising:
providing an RFID device having a first loop antenna and a second antenna configured to operate in a plurality of exclusive non-overlapping frequency bands;
receiving, from an interrogating device, an interrogation signal via one of the first antenna and the second antenna; and
transmitting, in response to the interrogation signal, an identification signal to identify the RFID device to the interrogating device via one of the first antenna and the second antenna, wherein the identification signal is generated by modulating an RF field provided by the interrogating device.

71. The method of claim 70, wherein the interrogation signal and the identification signal have a same carrier frequency.

72. The method of claim 70, further comprising:
switching between an active mode and a passive mode, wherein in the active mode the RFID device modulates an RF field generated by the RFID device and in the passive mode the RFID device modulates the RF field provided by the interrogating device.

73. The method of claim 72, wherein the RFID device is configured to communicate the identification signal at a bit rate specified by the interrogating device.

74. The method of claim 73, further comprising:
transitioning the RFID device from a sleep state in response to a wake up command from the interrogating device.

75. The method of claim 70, further comprising:
generating a random number to identify the RFID device, wherein the identification signal includes the random number.

76. A method of forming a radio frequency identification (RFID) device, the method comprising:
providing communication circuitry configured to receive interrogation signals and output identification signals;
forming a first loop antenna and a second antenna; and
coupling the first loop antenna and the second antenna to the communication circuitry to allow the communication circuitry to use the first loop antenna and the second antenna to communicate wireless signals, including the interrogation signals and the identification signals, in a plurality of exclusive non-overlapping frequency bands.

77. The method of claim 76, wherein the communication circuitry is configured to switch between an active mode of signal transmission and a passive mode of signal transmission.

78. The method of claim 76, wherein the communication circuitry is configured to communicate the identification signals at a bit rate specified by an interrogating device.

79. The method of claim 78, wherein the communication circuitry is configured to transition from a sleep state in response to a wake up command from the interrogating device.

80. The method of claim 76, wherein the communication circuitry is configured to generate a random number to identify the RFID device.

81. A radio frequency identification (RFID) system, comprising:
a first RFID device to transmit wireless interrogation signals;
a second RFID device having a communication circuitry, a first loop antenna and a second antenna configured to operate at a plurality of frequencies, a first frequency of the frequencies being at least twice a second frequency of the frequencies, wherein in response to the interrogation signals, the second RFID device is to use one of the first loop antenna and the second antenna to provide identification signals, via modulating a radio frequency (RF) field provided by the first RFID device, the identification signals identifying the second RFID device to the first RFID device.

82. The system of claim 81, wherein the second RFID device comprises a transmitter configured communicate with the first RFID device in one of a first communication mode and a second communication mode determined by the first RFID device, wherein in accordance with the first communication mode the transmitter modulates an RF field generated by the second RFID device and in accordance with the second communication mode the transmitter modulates an RF field generated by the first RFID device.

83. The system of claim 82, wherein the transmitter is configured to transmit at a bit rate specified by the first RFID device.

84. The system of claim 81, wherein the communication circuitry is configured to transition from a sleep state in response to a wake up command from the first RFID device.

85. The system of claim 81, wherein the communication circuitry of the second RFID device is configured to use the first loop antenna to receive the interrogation signals and use the second antenna to transmit the identification signals.

86. The system of claim 81, wherein the interrogation signals and the identification signals have a same carrier frequency.

87. The system of claim 81, wherein the identification signals include a random number generated by the second RFID device to identify the second RFID device.

* * * * *